3,061,633
SYNTHESIS OF ANTIBIOTICALLY ACTIVE
AMINO ACID
Akira Miyake, Nishinomiya, Japan, assignor to
Takeda Pharmaceutical Industries, Ltd.
No Drawing. Filed May 21, 1959, Ser. No. 814,667
Claims priority, application Japan May 23, 1958
9 Claims. (Cl. 260—482)

The present invention relates to a method for the synthesis of an antibiotically active amino acid. More specifically, the invention relates to the synthesis of the antibiotic L-δ-hydroxy-γ-oxonorvaline and of optically inactive DL-δ-hydroxy-γ-oxonorvaline from which the aforesaid levorotary compound can be recovered.

The production of L-δ-hydroxy-γ-oxonorvaline by the culture of a microorganism (e.g. *Streptomyces akiyoshiensis*, Strain H8998 [ATCC No. 13479; IFO 3810] or Strain H43464 [ATCC No. 13480; IFO 3811]) has been disclosed inter alia in the application for U.S. Letters Patent Ser. No. 812,838, filed May 13, 1959, by Sueo Tatsuoka and others. The fact that the said compound has an effective antibacterial activity against pathogenic tubercle bacilli—i.e. that L-δ-hydroxy-γ-oxonorvaline completely inhibits the growth of e.g. human type tubercle bacilli H37Rv strain, of isonicotinoyl hydrazide-resistant H37Rv strain, of streptomycin-resistant H37Rv strain, etc.—has also been disclosed in the said application.

The present invention is addressed to and solves the problem of developing a wholly synthetic, and industrially more feasible, process for the preparation of L-δ-hydroxy-γ-oxonorvaline:

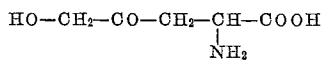

The desired synthesis is based on the fact that, according to the invention, an optically inactive compound having the preceding formula is produced by subjecting a compound representable by the formula of

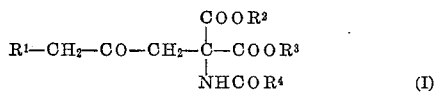

wherein $R^1$ is a halogen atom or a lower acyloxy radical, and $R^2$, $R^3$ and $R^4$ are same or different radicals and are all lower alkyl radicals, to both hydrolysis and decarboxylation. The starting compound (I) may be obtained by means of the process described in e.g. Helvetica Chimica Acta, vol. 35 (1952), p. 407 or ibid. vol. 38 (1955), p. 22.

When the compound (I) is hydrolyzed, $R^1$ is changed into hydroxyl group, and —$COOR^2$, —$COOR^3$ and —$NHCOR^4$ are hydrolyzed into carboxyl, carboxyl and amino groups, respectively. Depending on the reaction conditions employed some of these hydrolyzable groups can be left in the original state. These partially hydrolyzed compounds can, of course, be converted into compounds of which all hydrolyzable groups are hydrolyzed.

A compound in which either or both of —$COOR^2$ and —$COOR^3$ of the starting compound (I) are hydrolyzed is a β-dicarboxylic acid or its mono-ester, and therefore one of the carboxyl groups is in an easily eliminable state. As the case may be, the elimination simultaneously occurs with the hydrolysis. If the elimination is not brought about simultaneously, the elimination can be stimulated by heating with or without a proper reagent.

The hydrolysis is stimulated by the presence of a suitable acid or basic reagent. As such a reagent, a hydroxide or a carbonate of an alkali metal or an alkaline earth metal, or a mineral acid such as hydrochloric acid, sulfuric acid and phosphoric acid, may be employed. The reaction may conveniently be conducted under heating in such a solvent as water and lower aliphatic alcohols.

When $R^1$ is halogen, it may be converted into an acyloxy group by means of a corresponding lower fatty acid anhydride; the product is then hydrolyzed.

As the hydrolysis is generally effected under heating, elimination of carboxyl radical occurs simultaneously with this hydrolysis. The elimination sometimes occurs before all of —$COOR^2$, —$COOR^3$ and —$NHCOR^4$ are hydrolyzed, so that δ- or N-substituted compound of γ-oxonorvaline or its ester is formed. When the hydrolysis is conducted at a rather low temperature, the elimination does not occur or occurs slightly in some cases. In such cases, the product can be heated at a considerably high temperature in the presence of a suitable solvent such as water to bring about the elimination easily. In this reaction, the elimination may be stimulated by addition of organic or inorganic bases such as alkali hydroxide or pyridine bases.

As δ-hydroxy-γ-oxonorvaline has one asymmetric center, there would be compounds having D- and L-configurations. Moreover, decarboxylated compounds among the intermediates obtained have also two stereoisomers. As the process described above can be carried out irrespective of the steric configuration, optical resolution may be conducted on the intermediate, and the optically active intermediate converted into the final product. Alternatively, the optically inactive product may be resolved into an optically active final product.

The optical resolution may be brought about in accordance with any conventional method applicable to amino acid or its derivatives. That is, the inactive compound converted into diastereoisomers by means of an optically active acid or base, then either or both of the diastereoisomers are isolated by fractional crystallization, and an optically active compound is liberated from the isolated isomer or from the mother liquor.

As the organic base, alkaloids such as brucine, strychnine and quinine and other organic bases such as ephedrine and phenyl isopropyl amine may be employed, and as the organic acid, tartaric acid, camphor sulfonic acid and the like may be employed.

When L-δ-hydroxy-γ-oxonorvaline thus obtained is melted together with compound (called "HON") recovered from an incubation broth of *Streptomyces akiyoshiensis*, no depression of the melting point is observed. The other physicochemical properties of the L-δ-hydroxy-γ-oxonorvaline are in complete agreement with those of HON, and no significant difference is observed in their antibacterial properties.

For both dehydrolyzing and decarboxylating the material in any case in this invention, "heating" may be conducted at a temperature of about 70 to 120° C., but the temperature may be suitably selectable so as to be effected the desired reaction.

Like HON, L-δ-hydroxy-γ-oxonorvaline, selectively shows remarkable antibacterial activity against pathogenic tubercle bacilli and, its toxicity being very low, it is safely and effectively administered orally or parenterally for treating various tuberculous disaffections, e.g. those due to the action of *Mycobacterium tuberculosis* var. *hominis*.

The following examples set forth presently-preferred illustrative embodiments of the invention. In these examples, parts by weight bear the same relation to parts by volume as do grams to milliliters.

Example 1

A mixture of 1.0 part by weight of ethyl N-acetyl-α-ethoxycarbonyl-δ-bromo-γ-oxonorvalinate and 10 parts by volume of 10% hydrochloric acid is heated on a water bath for 1 hour. The reaction mixture is diluted with water, then the hydrochloric acid is removed with "Amberlite IR–45 (type OH)." The solution is concentrated under reduced pressure. After decolorizing with activated charcoal, the concentrate is dissolved in water. Acetone is added to the aqueous solution to obtain 0.1 part by weight of DL-δ-hydroxy-γ-oxonorvaline as white needles.

Example 2

A mixture of 3.5 parts by weight of ethyl N-acetyl-α-ethoxycarbonyl-δ-bromo-γ-oxonorvalinate, 12 parts by weight of newly precipitated barium carbonate and 30 parts by volume of water is heated on a water-bath at 95–100° C. for 6 hours in a stream of carbon dioxide. After cooling, the mixture is filtered, and the precipitate is washed with water. The filtrate combined with the washings is passed through a column packed with 40 parts by volume of "Amberlite IR–120 (type H)," and the resin is washed with water to collect an eluate having its pH below 4.0. The eluate is concentrated under reduced pressure to 30 parts by volume. To the concentrate are added 10 parts by volume of concentrated hydrochloric acid, then the mixture is heated on a water-bath for 1 hour. The reaction mixture is diluted with 40 parts by volume of water, and the solution is passed through a column packed with 100 parts by volume of "Amberlite IR–45 (type OH)." Then the resin is washed with water to collect an eluate showing a yellow ninhydrin reaction. The eluate is concentrated under reduced pressure to 5 parts by volume. The concentrate is decolorized with active charcoal, and thrice its volume of acetone is added to obtain a crude product. The product is dissolved in a small quantity of water, and the solution is decolorized with active charcoal. The purification process is repeated twice to obtain 0.6 part by weight of DL-δ-hydroxy-γ-oxonorvaline as white needles.

Example 3

To a solution of 3.5 parts by weight of ethyl N-acetyl-α-ethoxycarbonyl-δ-bromo-γ-oxonorvalinate in 70 parts by volume of ethanol is added dropwise a solution made from 0.88 part by weight of sodium hydroxide, 3.5 parts by volume of water and 14 parts by volume of ethanol under stirring at a room temperature (20–30° C.), keeping the pH of the mixture below 8.0. The mixture is further stirred at a room temperature for 3 hours, then is refluxed on a water-bath at 95–100° C. for 8 hours. After adding 70 parts by volume of water, the mixture is passed through 20 parts by volume of "Amberlite IR–120 (type H)." The resin is washed with water to collect an eluate having its pH below 4.0. The eluate is concentrated under reduced pressure to about 30 parts by volume. The concentrate is heated on a water-bath for 1 hour together with 10 parts by volume of concentrated hydrochloric acid. A mixture of the solution and 40 parts by volume of water is passed through 100 parts by volume of "Amberlite IR–45 (type OH)," and the tower is washed with water to collect fractions showing a yellow color reaction with ninhydrin. The fractions are concentrated under reduced pressure to make the volume about 5 parts by volume. The concentrate is decolorized with active charcoal, then thrice its volume of acetone is added to obtain 0.140 part by weight of crude crystals. A solution of the crude crystals in a small quantity of water is decolorized with active charcoal, and acetone is added. The recrystallization is repeated twice to obtain 0.6 part by weight of DL-δ-hydroxy-γ-oxonorvaline.

Example 4

To a solution of 12 parts by weight of ethyl N-acetyl-α-ethoxycarbonyl-δ-bromo-γ-oxonorvalinate in 36 parts by volume of glacial acetic acid are added 4 parts by weight of anhydrous potassium acetate. Then the mixture is heated under stirring for 6 hours at 60–75° C. After cooling, the potassium bromide which has formed is removed. Then the solution is concentrated under reduced pressure, and the residue is dissolved in ethyl acetate. The ethyl acetate solution is washed with water, an aqueous solution of sodium bicarbonate and water, successively. After drying, the solvent is removed under reduced pressure. Ether is added to the residue to crystallize the product. Recrystallization of the product from ethanol gives 9.5 parts by weight of ethyl N,O-diacetyl-α-ethoxycarbonyl-δ-hydroxy-γ-oxonorvalinate, M.P. 105–106° C.

*Analysis.*—Calcd. for $C_{14}H_{21}O_8N$; C, 50.75; H, 6.39; N, 4.23%. Found: C, 50.49; H, 6.23; N, 4.12%.

A mixture of 3.3 parts by weight of the above product and 33 parts by volume of 10% hydrochloric acid is boiled for 1 hour. The mixture is concentrated under reduced pressure, than water is added to the concentrate. After decolorizing with activated charcoal, the solution is neutralized with pyridine. The solution is concentrated under reduced pressure, then ethanol is added to the residue to form a pale brown precipitate. After decolorizing a hot aqueous solution of the precipitate, acetone is added to obtain 0.8 part by weight of DL-δ-hydroxy-γ-oxonorvaline as white crystals.

Example 5

To a solution of 7 parts by weight of potassium hydroxide in 70 parts by volume of anhydrous methanol are added 10 parts by weight of ethyl acetate, and the mixture is boiled for 2 hours. After cooling, 35.2 parts by weight of ethyl N-acetyl-α-ethoxycarbonyl-δ-bromo-γ-oxonorvalinate are added to the solution, and the mixture is stirred at a room temperature for a while, then is boiled for 5 hours. After cooling, the potassium bromide which has formed is removed, and the filtrate is concentrated under reduced pressure. A solution of the residue in ethyl acetate is washed with water and is dried. The solvent is removed under reduced pressure to obtain 30 parts by weight of crude ethyl N-acetyl-α-ethoxycarbonyl-δ-hydroxy-γ-oxonorvalinate as pale yellow resinous substance.

Three parts by weight of the above product was heated on a water bath for 1 hour together with 30 parts by volume of 10% hydrochloric acid. Under reduced pressure, the hydrochloric acid is removed by distillation. An aqueous solution of the residue is passed through a tower packed with 200 parts by volume of "Amberlite IR–45 (type OH)," and the tower is washed with water. The eluate combined with the washings is concentrated under reduced pressure. To the decolorized concentrate, decolorized with active charcoal, is added acetone to obtain 0.5 part by weight of DL-δ-hydroxy-γ-oxonorvaline.

*Analysis.*—Calcd. for $C_5H_9O_4N$: C, 40.81; H, 6.17; N, 9.52%. Found: C, 40.63; H, 6.20; N, 9.64%.

Example 6

To a solution of 23.2 parts by weight of ethyl N-acetyl-α-ethoxycarbonyl-δ-hydroxy-γ-oxonorvalinate in 230 parts by volume of ethanol is added dropwise under stirring a solution made from 6.8 parts by weight of sodium hydroxide, 27 parts by volume of water and 100 parts by volume of ethanol to separate a pale yellow precipitate. A solution of the precipitate in 400 parts by volume of water is passed through a tower packed with 200 parts by volume of "Amberlite IR–120 (type H)," and the tower is washed with water. The eluate combined with the washings is concentrated under reduced pressure. Acetone is added to the concentrate to obtain 6.5 parts by weight of N-acetyl-α-carboxy-δ-hydroxy-γ-oxonorvaline, M.P. 125–130° C. (decomp.) as white crystals.

A solution of 2.3 parts by weight of the above product in 20 parts by volume of 10% hydrochloric acid is heated on a water-bath for 1 hour, then the mixture treated as set forth in Example 5 to obtain 0.2 part by weight of DL-δ-hydroxy-γ-oxonorvaline as white crystals.

*Example 7*

A solution of 2.3 parts by weight of N-acetal-α-carboxy-δ-hydroxy-oxonorvaline in 20 parts by volume of water is boiled, then carbon dioxide gas is vigorously generated for 10 minutes. Concentration of the reaction mixture under reduced pressure gives 2.0 parts by weight of N-acetyl-δ-hydroxy-γ-oxonorvaline as a pale yellow resinous substance.

After heating the product with 20 parts by volume of 10% hydrochloric acid, the treatment is effected as in Example 5 to obtain 0.2 part by weight of DL-δ-hydroxy-γ-oxonorvaline as white crystals.

*Example 8*

Optical resolution of N-acetyl-δ-hydroxy-γ-oxonorvaline is effected in conventional manner, using brucine to obtain the brucine salt of the compound having L-configuration (M.P. 119–124° C.). Brucine is removed from an aqueous solution of the salt using "Amberlite IR–120 (type H)." Concentration of the aqueous solution gives L-N-acetyl-δ-hydroxy-γ-oxonorvaline. This product is hydrolyzed as described in Example 7 to obtain L-δ-hydroxy-γ-oxonorvaline showing $[\alpha]_D^{20} = -6.0°$ (c., 1%, $H_2O$).

*Example 9*

To an ethanolic solution of 3.4 parts by weight of DL-N-acetyl-δ-hydroxy-γ-oxonorvaline are added 10 parts by weight of brucine. The mixture is heated to render the mixture homogeneous. Ether is added to the mixture to deposit a precipitate, and the precipitate is recrystallized from ethanol to obtain a brucine salt of L-N-acetyl-δ-hydroxy-γ-oxonorvaline, M.P. 119–124° C., as white needles. An aqueous solution of the brucine salt is passed through a tower packed with "Amberlite IR–120 (type OH)" to remove the brucine, then the eluate is concentrated under reduced pressure to produce L-N-acetyl-δ-hydroxy-γ-oxonorvaline as a pale yellow resinous substance. After warming the product together with 10% hydrochloric acid on a water-bath for 1 hour, the mixture is concentrated under reduced pressure. An aqueous solution of the residue is passed through a tower packed with "Amberlite IR–45 (type OH)," and then the tower is washed with water. The eluate is concentrated under reduced pressure together with the washings, and acetone is added thereto. The white crystals separated are recrystallized from water-acetone to obtain L-δ-hydroxy-γ-oxonorvaline as white prisms; $[\alpha]_D^{20} = -6°$ (c., 1%, $H_2O$).

*Example 10*

To 1.2 parts by weight (0.005 mol.) of ethyl N-acetyl-δ-chloro-γ-oxo-DL-norvalinate dissolved in 10 parts by volume of acetic acid is added 0.7 part by weight of newly prepared anhydrous potassium acetate, and the mixture is heated on an oil-bath under reflux for two hours. After cooling the mixture, crystals of potassium chloride are filtered out, then the filtrate is concentrated under reduced pressure. The residue dissolved in 100 parts by volume of ethyl acetate is washed with an aqueous solution of sodium bicarbonate, then dried with anhydrous sodium sulfate. The solvent used is evaporated to obtain 1.2 parts by weight of brownish oily substance. To this substance is added 20 parts by volume of 10% hydrochloric acid, and the mixture is heated on a boiling water bath for 1.5 hours. The solvent used is evaporated under reduced pressure. To the residue is added 5 parts by volume of water, the mixture is decolorized with a small amount of active charcoal, and is neutralized with pyridine, then 25 parts by volume of ethanol is added thereto to separate colorless needles. Recrystallization of the product from water-acetone gives 0.2 part by weight of refined crystals of DL-δ-hydroxy-γ-oxonorvaline. The yield is 27%.

Amberlite resins marketed by Rohm & Haas Co., Philadelphia, Pa., are well known in the ion exchange art; see for example "Ion Exchangers in Organic and Biochemistry" by Calmon and Kressman, Interscience Publishers, Inc., New York, New York (1957). Amberlite IR–120 is a sulfonated crosslinked polystyrene bead resin (strongly acid ion exchange resin); Amberlite IR–45 is polystyrene beads with polyamine exchange groups (weak base anion exchange resin).

It will of course be understood that equivalent types of ion exchangers now on the market may be employed in lieu of those described by way of exemplification in the examples.

Having thus disclosed the invention, what is claimed is:

1. A process for producing an optically inactive compound of the formula

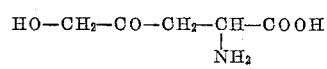

which comprises subjecting a compound of the formula

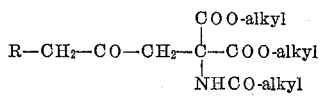

wherein each alkyl group is a lower alkyl group, R is a member selected from the group consisting of a halogen atom and a lower alkylcarbonyloxy group, to both hydrolysis and decarboxylation to yield in the aforesaid optically inactive compound.

2. In a process for producing an optically inactive compound of the formula

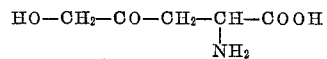

the step of subjecting a compound of the formula

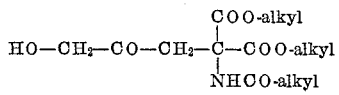

wherein each alkyl group is a lower alkyl group, to both hydrolysis and decarboxylation to yield the aforesaid optically inactive compound.

3. A process for producing a levorotary compound of the formula

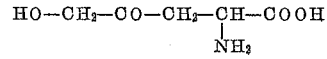

which comprises hydrolyzing a levorotary compound having the formula

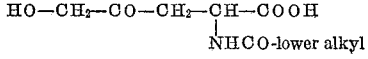

4. Ethyl N,O - diacetyl-α-ethoxycarbonyl-δ-hydroxy-γ-oxonorvalinate of the formula

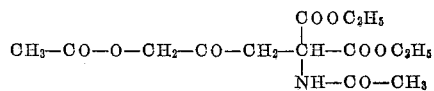

5. Ethyl N - acetyl - α - ethoxycarbonyl - δ - hydroxy-γ-oxonorvalinate.
6. N-acetyl-δ-hydroxy-γ-oxonorvaline.
7. L-N-acetyl-δ-hydroxy-γ-oxonorvaline.
8. N-acetyl-α-carboxy-δ-hydroxy-γ-oxonorvaline.

9. In a process for producing an optically inactive compound of the formula

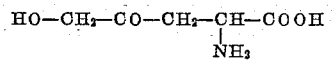

the step of subjecting a compound of the formula

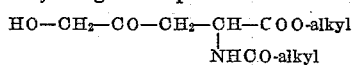

wherein each alkyl group is a lower alkyl group, to hydrolysis to yield the aforesaid optically inactive compound.

References Cited in the file of this patent

UNITED STATES PATENTS 2,626,263     Gaudry ---------------- Jan. 20, 1953

OTHER REFERENCES

Wiss et al.: Helv. Chim. Acta, 35, 407 to 411 (1952).
Hegedus: Helv. Chim. Acta, 38, 22 to 27 (1955).

UNITED STATES PATENT OFFICE
CERTIFICATE OF CORRECTION

Patent No. 3,061,633            October 30, 1962

Akira Miyake

It is hereby certified that error appears in the above numbered patent requiring correction and that the said Letters Patent should read as corrected below.

Column 5, line 5, for "acetal" read -- acetyl --; column 6, line 34, strike out "in".

Signed and sealed this 3rd day of September 1963.

(SEAL)
Attest:

ERNEST W. SWIDER
Attesting Officer

DAVID L. LADD
Commissioner of Patents